(12) United States Patent
Volovets et al.

(10) Patent No.: US 6,807,984 B2
(45) Date of Patent: Oct. 26, 2004

(54) HIGH FLOW HIGH CONTROL VALVE AND ASSEMBLY

(75) Inventors: Michael Volovets, Eden Prairie, MN (US); Arne Benson, Shakopee, MN (US)

(73) Assignee: FSI International, Inc., Chaska, MN (US)

( * ) Notice: Subject to any disclaimer, the term of this patent is extended or adjusted under 35 U.S.C. 154(b) by 42 days.

(21) Appl. No.: 10/034,318

(22) Filed: Dec. 26, 2001

(65) Prior Publication Data

US 2003/0116204 A1 Jun. 26, 2003

(51) Int. Cl.$^7$ ............................................. F16K 3/32
(52) U.S. Cl. ........................ 137/625.3; 251/335.1
(58) Field of Search ................ 137/625.3, 625.33; 251/121, 122, 335.1

(56) References Cited

U.S. PATENT DOCUMENTS

| | | | |
|---|---|---|---|
| 371,063 A | 10/1887 | Hays | |
| 2,117,182 A | * 5/1938 | Lewis | 137/625.3 |
| 2,289,946 A | 7/1942 | Weatherhead, Jr. | 251/146 |
| 2,490,511 A | 12/1949 | Courtot | 251/144 |
| 2,541,176 A | * 2/1951 | Rockwell | 137/625.3 |
| 2,615,671 A | 10/1952 | Landon | 251/34 |
| 2,918,083 A | 12/1959 | Clark, Jr. et al. | 137/515.5 |
| 3,187,775 A | * 6/1965 | Pinnell | 137/625.3 |
| 3,438,393 A | 4/1969 | Godley, II | 137/533.17 |
| 3,550,617 A | 12/1970 | Johnson | 137/514.5 |
| 3,605,802 A | 9/1971 | Hertell | 137/514.5 |
| 3,971,411 A | 7/1976 | Baumann | 137/625.3 |
| 4,217,927 A | 8/1980 | Morita | 137/493.3 |
| 4,245,816 A | 1/1981 | Johnson | 251/282 |
| 4,270,569 A | 6/1981 | Reay et al. | 137/514.7 |
| 4,781,216 A | 11/1988 | Arnoult et al. | 137/614.19 |
| 4,795,131 A | 1/1989 | Scarano et al. | 251/63 |
| 4,967,791 A | 11/1990 | Sternberger | 137/822 |
| 5,150,734 A | 9/1992 | Chiba | 137/567 |
| 5,163,476 A | 11/1992 | Wessman | 137/625.3 |
| 5,183,075 A | 2/1993 | Stein | 137/493.6 |
| 5,255,704 A | 10/1993 | Bennett | 137/454.5 |
| 5,603,348 A | 2/1997 | Geringer | 137/514.7 |
| 5,671,903 A | 9/1997 | Homma et al. | 251/69 |
| 5,771,884 A | 6/1998 | Yarnall et al. | 128/205.24 |
| 5,868,059 A | 2/1999 | Smith | 91/454 |
| 5,954,086 A | * 9/1999 | Ronchi | 137/244 |
| 6,000,416 A | * 12/1999 | Kingsford et al. | 137/1 |
| 6,293,514 B1 | * 9/2001 | Pechoux et al. | 251/122 |

* cited by examiner

Primary Examiner—John Fox
(74) Attorney, Agent, or Firm—Kagan Binder PLLC

(57) ABSTRACT

A valve and a valve assembly are provided that exhibit both highly controlled metering of fluid, as well as a high volume of fluid flow when the valve is in the fully open position. The regulating portion of the valve is provided with channels having different cross-sectional shapes, or channels having different lengths to provide staged flow. The valve is further provided with a fluid boundary element that is movably operably connected to the valve for mounting the valve to the valve body.

13 Claims, 6 Drawing Sheets

HIGH FLOW HIGH CONTROL VALVE AND ASSEMBLY

FIELD OF THE INVENTION

The present invention relates to a valve assembly. More specifically, the present invention relates to a valve assembly allowing high flow and high control of fluid through a valve body wherein the valve assembly comprises a moveable valve with a shaped regulating portion.

BACKGROUND OF THE INVENTION

Valve assemblies, which are a combination of a valve in a valve body, have been used for the control of fluid traveling from one location to another. Valve assemblies have been provided in various sizes and configurations, the designs of which vary greatly depending on the flow requirements for specific system application or use.

U.S. Pat. No. 5,163,476 discloses a regulator cone of substantially cylindrical form having four generally V-shaped grooves on its outer circumferential surface. Two of the grooves define primary grooves that extend along the entire active length of the regulator cone. The other two grooves define secondary grooves that extend along the portion of the active length of the regulator cone where the primary grooves have their largest cross-sectional area.

U.S. Pat. No. 6,000,416 discloses a valve apparatus comprising a valve body, a piston disposed within the valve body, and a rolling diaphragm poppet that is attached to the piston to regulate fluid flow through the valve via interaction with a valve seat within the valve body. As shown in FIGS. 8 and 9, and in the discussion at column 12, line 65 through column 13, line 27, the poppet head may include a notch that runs axially along the head a distance away from the front side surface of the head. The notch can have a number of different geometric configurations. The exact size of the notch, and the number of notches disposed in the poppet head, can vary depending on the fluid flow rate range desired for a particular valve application.

SUMMARY OF THE INVENTION

There is a need to provide valves that have the capability of providing precise regulation of small amounts of fluid, but also permitting high flow rates of fluid when such is required. Additionally, the valve should be free of chattering or hammering during use to ensure accurate and predictable fluid flow. The challenge is satisfying these requirements in a single valve with a relatively short stroke length. A short stroke length is beneficial in that quicker flow rate changes from zero to a valve's maximum flow rate can be effected. Additionally, a valve having a shorter stroke has a smaller overall size as compared to conventional valves. Smaller valves are beneficial in the ability to fit valves of the present invention in crowded equipment systems, and to reduce overall costs of valves and their associated components.

The present invention provides a valve assembly for controlling fluid flowing through a valve body during successive strokes of a valve by controlled movement relative to a passage in the valve body. The valve comprises a regulating portion having a tip connected with a valve seat for engaging with a valve body seat to define a closed position of the valve body passage. The regulating portion preferably has a plurality of channels formed in an outer circumferential surface thereof, each of said channels defining a greater open area cross-section at a point nearer a tip of the regulating portion than a point nearer the valve seat. This configuration provides a greater flow of fluid as the regulating portion is controllably moved relative to the valve body passage. At least one of the channels preferably has an open area shape different from the open area shape of at least one other channel at the same cross-section location of the regulating portion to achieve desired flow rates and to minimize valve hammering. Additionally, the outer circumferential surface of the regulating portion is preferably parallel to the direction of stroke of the valve so that the valve can be effectively guided with less likelihood of valve hammering. In a preferred embodiment, the valve further comprises a fluid boundary element movably operably connected to the valve for mounting the valve to the valve body.

Additionally, the present invention provides a valve with a regulating portion having a tip connected with a valve seat for engaging with a valve body seat to define a closed position of the valve body passage, the regulating portion preferably having a plurality of channels formed in an outer circumferential surface thereof. Each of the channels preferably defines a greater open area cross-section at a point nearer a tip of the regulating portion than a point nearer the valve seat so that fluid flowing through a valve body containing the valve can flow in a staged increase in flow as the valve regulating portion is controllably moved relative to the valve body passage. In this embodiment, at least one channel preferably extends further toward the seat of the regulating portion than at least one other channel. The outer circumferential surface of the regulating portion of the valve is also preferably parallel to the direction of stroke of the valve to facilitate guiding, and the valve preferably further comprises a fluid boundary element movably operably connected to the valve for mounting the valve to the valve body.

The present invention also provides a valve assembly comprising the valves as described above, together with a valve body and a valve actuator.

DETAILED DESCRIPTION

The valve of the present invention provides exceptional benefit in providing both highly controlled metering of fluid flowing through a valve body containing the valve, and also high volume of fluid flow through the valve when the valve is in the fully open position. This combination of exceptional flow characteristics is achieved in a relatively short stroke length of the valve which allows for quick reactions of the valve to desired flow changes. Additionally, these flow characteristics are achieved without chattering or hammering of the valve. These benefits are all accomplished in large part by way of those configurations of the regulating portion of the valve in accordance with the present invention and as exemplified by the plurality of embodiments described and suggested below.

Figure 1:
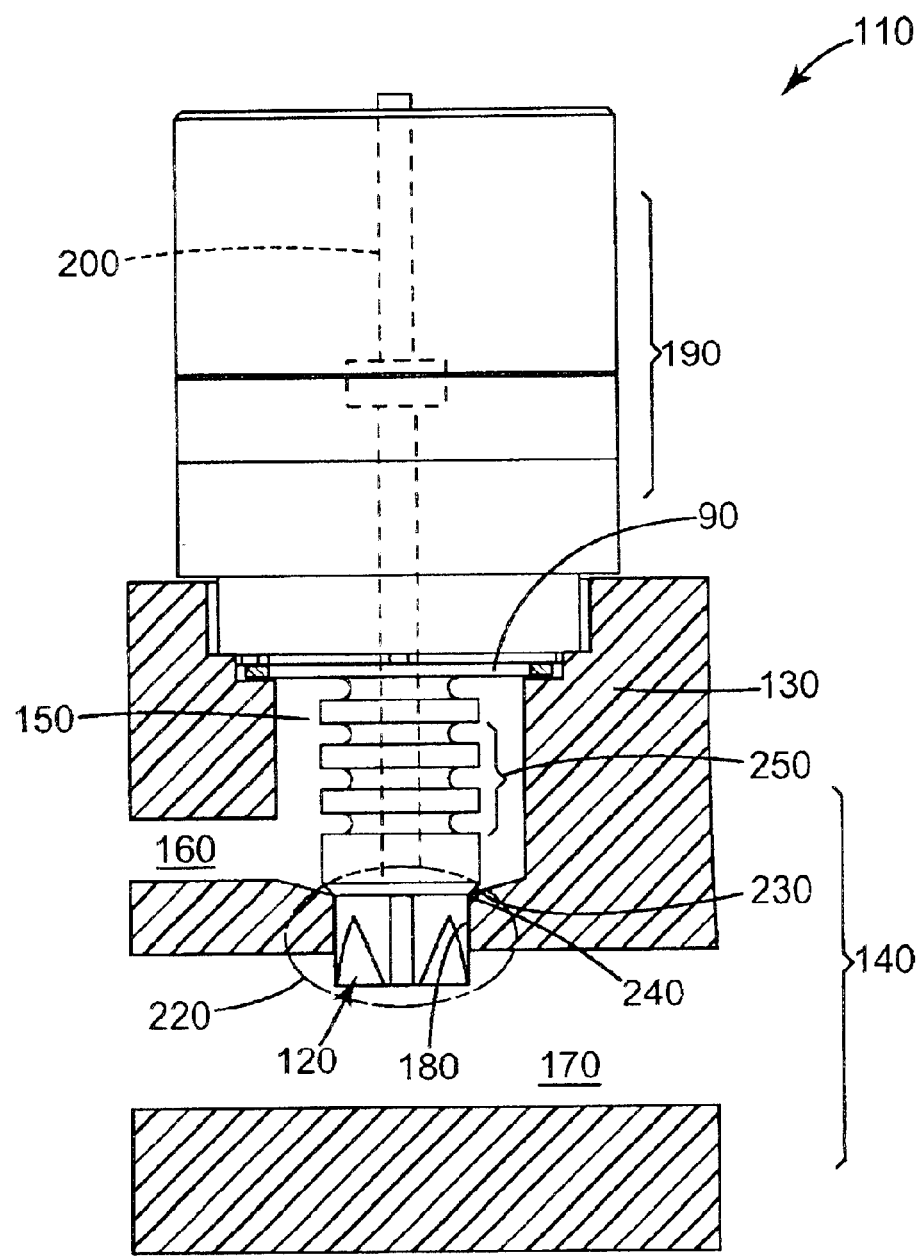
FIG. 1 is a schematic side view partially in cross-section of a valve assembly embodiment of the present invention comprising a valve at a fully closed position of its stroke.

Turning now to the drawings, wherein like reference numerals denote like parts, FIG. 1 is a schematic side view partially in cross-section of valve assembly 110, which is an embodiment of the present invention. Valve assembly 110 comprises valve 120 located within valve body 130. In the view of this figure, valve 120 is in the fully closed position of its stroke. Valve body 130 comprises fluid transfer housing 140, which in turn contains valve body chamber 150. Valve body chamber 150 communicates with inlet passage 160 and outlet passage 170, all provided in valve body 130. Valve actuator housing 190, shown connected to the valve body 130, contains valve actuator 200, which is attached to the movable portion of valve 120. Valve actuator 200 can be any known or developed drive device. Valve 120 is positioned within valve body 130 such that regulating portion 220 is located and sized to form a non-interference fit within valve passage 180 that fluidly connects the inlet passage 160 to the outlet passage 170. Valve 120 is provided with valve seat 230, which engages with valve body seat 240 of valve body 130 preferably completely about the valve passage 180 to form a leak-tight fitting when valve 120 is at the closed end of its stroke. Bellows 250 are shown expanded to accommodate the extension of valve actuator element 200 to fully close valve 120, while the fluid boundary element 90 segregates fluid from valve actuator 200. Fluid boundary element 90 may additionally be provided with a seal element, such as an o-ring, that assists in preventing leakage of fluid at the point of contact of fluid boundary element 90 with valve body 130.

Figure 2:
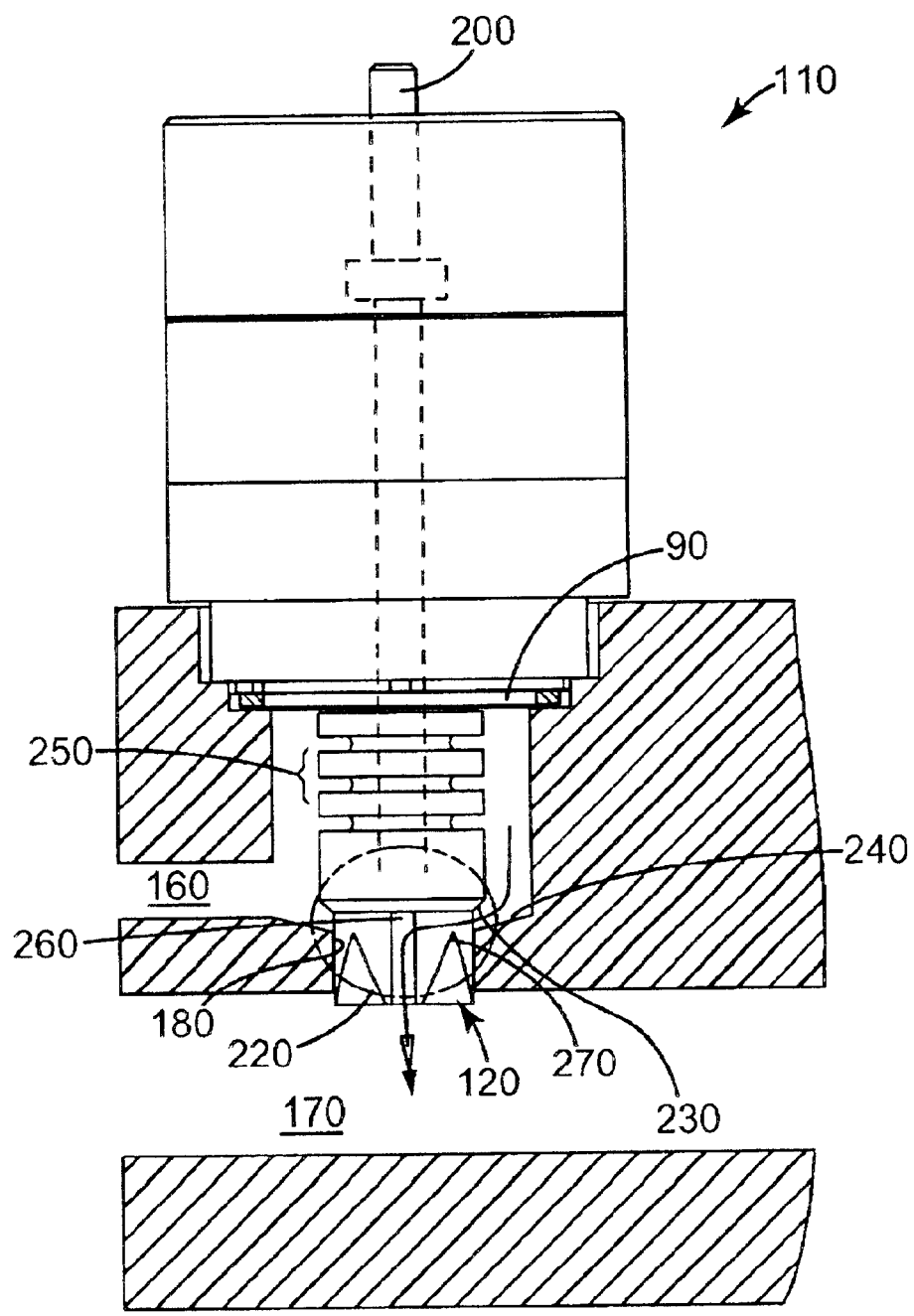
FIG. 2 is a schematic side view partially in cross-section of a valve assembly embodiment of the present invention comprising a valve at a partially open position of its stroke.

FIG. 2 shows valve 120 at a partially open position of its stroke. Thus, as actuator element 200 retracts valve 120 from within valve passage 180, bellows 250 are partially compressed, and fluid boundary element 90 continues to segregate fluid from valve actuator 200. At the same time, valve seat 230 on valve 120 is separated from valve body seat 240 surrounding valve passage 180, thereby eliminating the seal. At this point of retraction, fluid from inlet passage 160 can flow through rectangular cross-section channels 260 to outlet passage 170 while the triangular cross-section channels 270 are not yet open. In an alternative embodiment of the present invention, the identity of inlet passage 160 and outlet passage 170 may be reversed. In other words, fluid may flow in the opposite direction in the valve assembly 110 construction. In the view of FIG. 2, valve 120 is not sufficiently withdrawn from valve passage 180 to allow fluid from inlet passage 160 to flow through triangular cross-section channels 270. In other words, the cross-section of regulating portion 220 at the plane corresponding to a line drawn across the point where valve body seat 240 connects with valve passage 180 would have open area portions corresponding to rectangular cross-section channels 260, but not triangular cross-section channels 270. This provides a controlled first stage of fluid flow with a high degree of precision in metering fluid from inlet passage 160 to outlet passage 170.

Figure 3:
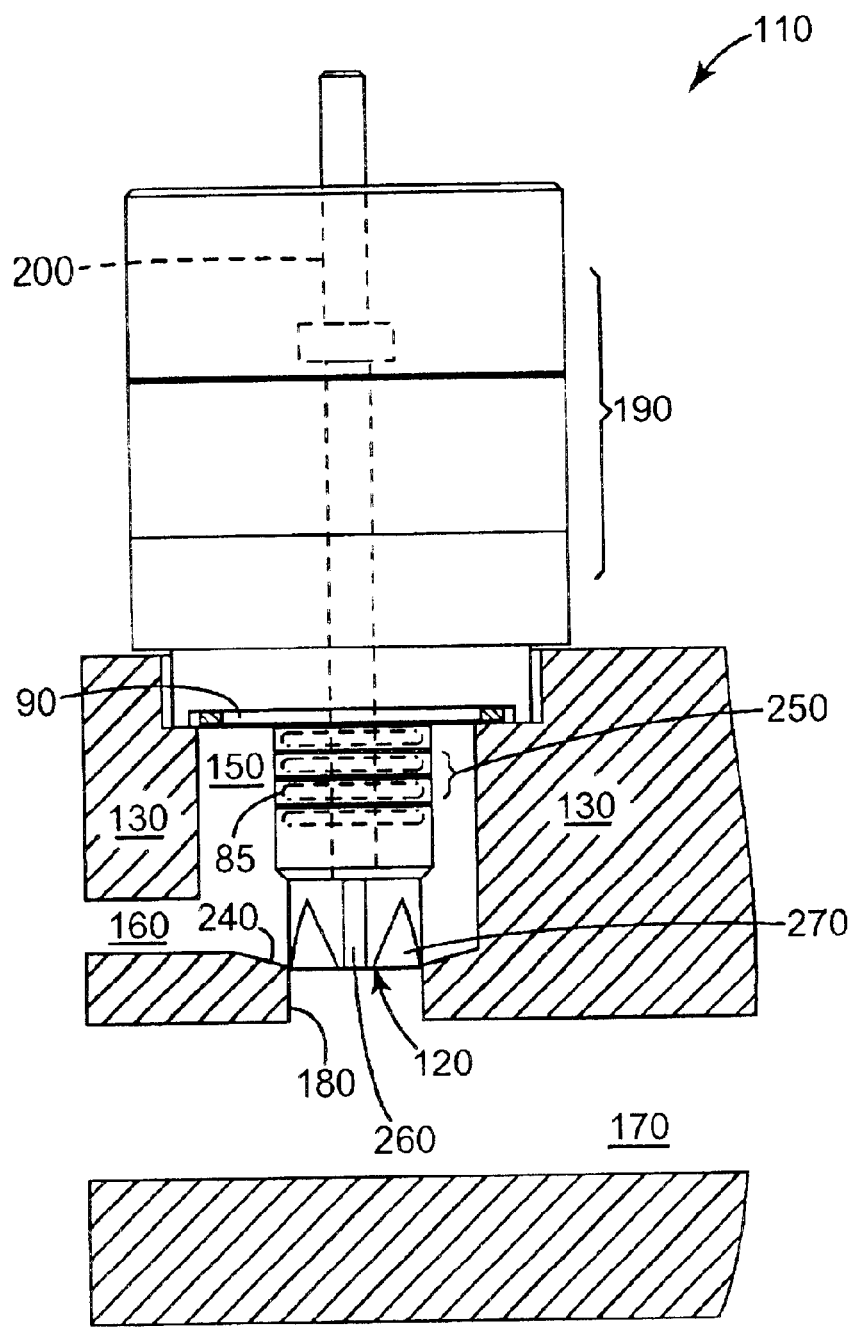
FIG. 3 is a schematic side view partially in cross-section of a valve assembly embodiment of the present invention comprising a valve at a fully open position of its stroke.

FIG. 3 shows valve 120 at the fully retracted open position of its stroke. Thus, as actuator 200 withdraws valve 120 from a valve passage 180, bellows 250 are further compressed, while fluid boundary element 90 continues to segregate fluid from valve actuator 200. At the same time, valve seat 230 on valve 120 is further separated from valve body seat 240 surrounding valve passage 180. Fluid from inlet passage 160 is allowed to flow not only through rectangular cross-section channels 260 to outlet passage 170, but additionally through triangular cross-section channels 270. In other words, the cross-section of regulating portion 220 at the plane corresponding to a line drawn across the point where valve body seat 240 connects with valve passage 180 would have open area portions corresponding to both rectangular cross-section channels 260 and triangular cross-section channels 270. FIG. 3 illustrates a fully open flow position of the valve 120. The very small solid cross-sectional area of regulating portion 220 at this position maximizes the fluid flow past valve 120 from inlet passage 160 to outlet passage 170.

Figure 4:
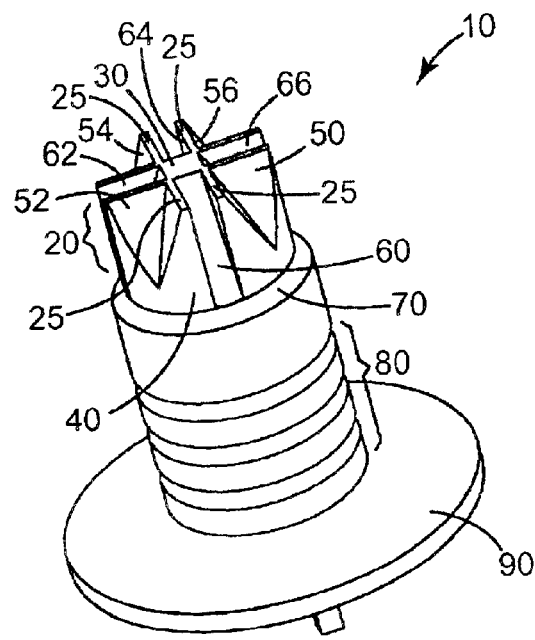
FIG. 4 is a perspective view of an embodiment of a valve of the present invention.

FIG. 4 is a perspective view of one embodiment of a valve 10 in accordance with the present invention. Regulating portion 20 of valve 10 extends from a tip 30 to a point 40 near a valve seat 70. The outer circumferential surface of regulating portion 20 is preferably generally parallel to the direction of stroke of the valve 10. Thus, the outer circumferential surface of regulating portion 20 as it extends from tip 30 to valve seat 70 (as used herein excluding surfaces of the channels formed therein as discussed below) preferably has substantially no taper. This is beneficial in preventing hammering or chattering because side force effects of fluid flow are believed to be minimized. Most preferably, regulating portion 20 (absent the channels formed therein as discussed below) has a shape of a cylinder. Alternative shapes, such as square, oval, triangular, or other non-regular cross-sectional shapes, may be utilized as desired.

A plurality of channels are provided in regulating portion 20, each of said channels defining a greater open area cross-section at a point nearer tip 30 than point 40 near valve seat 70. This is so that greater flow can be obtained as the regulating portion is controllably moved relative to a valve body passage (an operation of which is described below). In a preferred embodiment, at least one of the channels has an open area shape different from the open area shape of at least one other channel at the same cross-section location of the regulating portion 20.

FIG. 4 shows a particularly preferred embodiment, wherein triangular cross-section channels 50, 52, 54 and 56 are formed in an outer circumferential surface of regulating portion 20. These channels have an open area shape at a cross-section location of the regulating portion that is substantially an arc segment (or pie-shaped). Each of channels 50, 52, 54 and 56 have an open area that increases in the direction toward tip 30 of regulating portion 20. Rectangular cross-section channels 60, 62, 64 and 66 are preferably also formed in an outer circumferential surface of regulating portion 20. These channels have an open area shape at a cross-section location of the regulating portion that is substantially rectangular. Each of channels 60, 62, 64 and 66 also preferably have an open area that increases in the direction toward tip 30 of regulating portion 20. Rectangular cross-section channels 60, 62, 64 and 66 are preferably arranged evenly about the regulating portion 20 in alternating position with evenly spaced triangular cross-section channels 50, 52, 54 and 56. Rectangular cross-section channels 60, 62, 64 and 66 are preferably oppositely positioned in two pairs and preferably extend along substantially the entire length of the regulating portion 20. Triangular cross-section channels 50, 52, 54 and 56 are also preferably oppositely positioned in two pairs, and preferably extend along less than the entire length of regulating portion 20, and more preferably less than the extent of the rectangular cross-section channels 60, 62, 64 and 66.

Channels may be formed in the regulating portion 20 having any number of such channels and may have any appropriate cross-sectional shape to provide the flow characteristics desired for the particular valve use. Thus, channels may be provided with, for example a hemispherical cross-section, a square cross-section, a trapezoidal cross-section, or a multi-angular cross-section such as a star, an irregular cross-section, and the like. Additionally, the channel may have straight surfaces or sloped surfaces to form a curved complex channel shape. The exact angle and rate at which the cross-sectional area of the channel increases may be selected according to the desired flow characteristics of the valve assembly. Preferably, like shaped channels are placed opposite each other on the regulating portion so that symmetry is maintained. That is, for each differently shaped channel, it is preferable to provide a pair of such channels that are more preferably located at diametrically opposed (or otherwise balanced for shapes other than cylinders) locations. Under certain conditions, a lack of symmetry in the valve can result in offset pressures as fluid flows through the valve, potentially causing undesired sideways displacement of the valve in the valve seat. Such displacement may potentially interfere with free movement of the valve through the valve body passage and may cause unwanted hammering or chattering to the valve that may affect fluid flow. Additionally, if the regulating portion of the valve is subjected to friction with the valve body passage during use, damage to the valve may occur. Such damage may introduce undesired fine particles into the fluid flowing through the valve body, or alternatively may lead to failure of the valve.

In the particularly preferred embodiment of FIG. 4, triangular shaped channels 50, 52, 54 and 56 and rectangular shaped channels 60, 62, 64 and 66 are alternated in placement around the regulating portion of the valve. It has surprisingly been found that placement of the various shapes of channels in this orientation provides superior flow characteristic properties throughout the stroke of the valve. In particular, this configuration provides precise control of flow at low-flow rates and provides an extremely high amount of flow when the valve is in its fully open stroke position. Such high flow rate is achieved even in a short stroke of the valve.

In a particularly preferred embodiment of the present invention, the valve is configured to provide a multiple stage rate of fluid flow. In this embodiment, channels are provided having different lengths relative to one another along the regulating portion 20. For example, at least one channel may extend along substantially the entire length of the regulating portion 20, with one or more additional channels located on the regulating portion 20 and extending along less than the entire length of the regulating portion 20. Preferably, at least two of the channels are oppositely positioned and extend along substantially the entire length of the regulating portion 20. Additionally in a preferred embodiment, at least two channels are also oppositely positioned and extend along less than the entire length of the regulating portion. This configuration additionally provides staged flow of fluid past the valve 10 during use. The channels that extend along substantially the entire length of the regulating portion 20 may be, for example, either the triangular cross-section channels 50, 52, 54 or 56 or the rectangular cross-section channels 60, 62, 64 or 66. In a preferred embodiment, the longer channels comprise the rectangular cross-section channels. It has been found that when the longer channels are rectangular cross-section channels and shorter channels comprise the triangular channels, this configuration very effectively maximizes a cross-sectional reduction of the valve toward its tip 30.

The configuration of triangular cross-section channels 50, 52, 54 and 56 and rectangular cross-section channels 60, 62, 64 and 66 as shown in FIG. 4 also advantageously leaves a minimal but very effective structure of ribs 25 that facilitate fluid guidance with a passage of a valve body described below. While not being bound by theory, it is believed that these ribs act to stabilize the flow of fluid through the valve, thereby reducing hammering or chattering of the valve. As shown, the ribs 25 effectively define an overall cylinder shape, as in regulating portion 20, for fluid guidance. Such fluid guidance structure is provided even where a maximized flow rate is accommodated. In the illustrated embodiment, the ribs 25 provide a cross-type structure that has outer surface edges that are portions of and consistent with the overall regulating portion shape (e.g. a cylinder). It is contemplated that any number of other ribs that are defined between channels of any configuration may be otherwise provided in accordance with the goal of providing fluid guidance. In accordance with a preferred aspect of the present invention, effective ribs 25 are provided while channel open area is maximized. Moreover, it is preferred that the ribs 25 provide a balanced or symmetrical structure to provide even fluid guiding of the regulating portion 20 by a like-shaped passage of a valve body.

At the fully open position of the valve 10 stroke, the regulating portion 20 is preferably not fully withdrawn from the valve body passage, but rather preferably extends about 10 percent of its length within the valve body passage to prevent displacement of the valve 10 relative to the valve body. As described above, the ribs 25 will still provide effective fluid guidance at this point.

As noted above, the staged introduction of additional channels that are cut into the regulating portion 20 as one progresses from the point 40 near valve seat 70 to the tip 30 will introduce a transition point where the rate of change of fluid flow will change. The rate of increase of fluid flow can vary based on the angles of the channels that are cut into the regulating portion 20. A preferred embodiment of the present invention incorporates at least one transition point of the rate of change of flow. Other embodiments of the present invention contain a plurality of transition points generated by the introduction of further channels provided along the regulating portion 20 consistent with the above.

Valve seat 70 is provided for engaging with a valve body seat during use to form a leak-tight fitting. A valve seat 70 is preferably provided as a surface designed to interface with a valve body seat to form a leak tight fitting when in contact therewith. In one embodiment, valve seat 70 is a shoulder on the valve having a surface with an angle that is different from the angle of the surface of the corresponding shoulder of the valve body seat, so that a substantially single line contact is made between the valve seat and the valve body to form a seal. Alternatively, the valve seat may be a surface having an angle that corresponds to a surface with an angle of a similar and corresponding shoulder in the valve body seat. In this embodiment, the valve seat would be a flat surface shoulder. Alternatively, the valve seat would be a curved surface, such as a convex surface that corresponds to a concave surface having a similar arc such that the valve seat fits with the valve body seat. Similarly, the valve seat could be a concave surface that corresponds to a convex surface of a valve body seat in a like manner as described above.

Bellows 80 is provided as a particularly preferred connection between the regulating portion 20 and a fluid boundary element 90 for segregating fluid from valve actuators to be attached to valve 10. The fluid boundary element 90 is movably operably connected to the valve 10 for mounting the valve 10 to a valve body. This construction is preferred as part of the valve 10 of the present invention because it allows the valve 10 to be operated without having to overcome frictional forces that would be provided by sliding seal mechanisms such as an o-ring sliding seal. Prior art mechanisms, which operate to exclude fluid flow by using a friction contact sliding seal, inhibit the smooth operation of a valve because the frictional forces of the seal must be overcome by any actuator to begin movement of the valve. Once the initial frictional force of such a seal is overcome, a sliding seal valve tends to lurch forward in its travel path, frustrating fine control of the valve. Because the present fluid boundary element 90 is movably operably connected to the valve 10 by a movement mechanism such as bellows 80, no frictional forces need be overcome or compensated for so as not to inhibit the smooth operation of the valve 10. That is, the regulating portion 20 of valve 10 can be controllably moved relative to a valve body passage to control fluid flow in a smooth and accurate manner. A further benefit of a bellows is that movement of the valve can be effected without generating particles, which are difficult to avoid with a friction fit, sliding seal. The fluid boundary element 90 may be any construction itself depending upon how the valve 10 is to be connected or mounted to a valve body. The movement mechanism may comprise a bellows 80, as preferred, but may otherwise comprise and movement compensating mechanism that functionally permits the regulatory portion 20 of valve 10 to move based upon a particular application while permitting a valve portion, such as the fluid boundary element 90, to be mounted to the valve body on another structure associated therewith. A moveable connection may otherwise comprise, for example, a diaphragm or a flexible sleeve that rolls with the travel of the valve or the like.

Fluid boundary element 90 is provided to facilitate location and securement of the valve 10 in a valve body. Fluid boundary element 90 is shown as an annular flaring portion of the valve 10, but may be any appropriate shape or configuration that allows for attachment of the valve 10 to a valve body.

Figure 5:
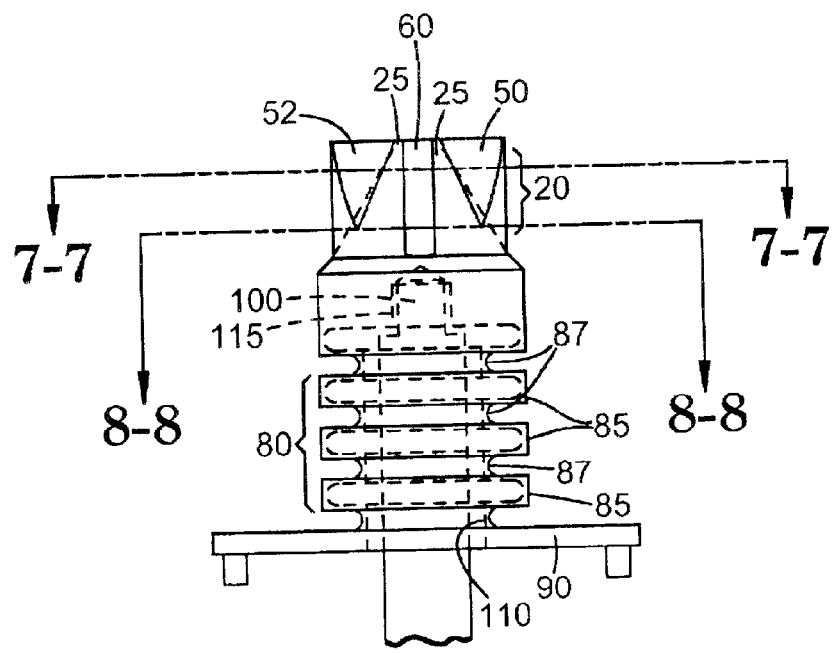
FIG. 5 is a side view of the embodiment of the valve shown in FIG. 4 of the present invention.

FIG. 5 is a side view of the embodiment of valve 10 shown in FIG. 4 of the present invention. A portion of a valve actuator element 100 (shown in phantom) is provided for operative connection between a valve actuator mechanism and the moveable regulating portion 20 of the valve 10. Valve actuator element 100 may be a threaded connector, or any other appropriate configuration to allow attachment of a valve actuator mechanism thereto. As illustrated, the valve 10 can have an internal bore 110 (shown in phantom) open through the fluid boundary element 90 and extending within the valve 10. Preferably, the bore 110 extends through the bellows 80 and includes a smaller threaded bore 115 within which the valve actuator element 100 can be threadingly engaged. The internal bore 110 also facilitates the flexible nature of bellows 80 by thinning the material walls thereof to the make them more flexible. Thus, it is preferable to extend bore 110 within each of the bellows portions 85 for thinning them in addition to the connecting portions 87 for greater flexibility. The number and nature of the bellows portion 85 that make the bellows 80 sufficiently flexible for a given stroke distance can be varied based upon a specific application. Bellows 80 easily accommodates the stroke distance of the valve of the present invention, which provides quick control of fluid flow from a precise metering flow to a full flow condition within a relatively short valve stroke. It is a particular advantage achievable by the present invention that movement compensating mechanisms, such as bellows or diaphragms or the like, that permit a limited valve stroke distance can easily be used with the flow controlling regulating portion 20 where a full range of fluid flow can be regulated within a short stroke distance. Of course, bellows and diaphragms and the like can be designed to permit greater stroke distances (e.g. more bellows portion or more flexible materials), but they can easily accommodate shorter stroke distances.

Any valve actuator element 100 can be otherwise operatively connected with the movable regulating portion 20 of the valve 10 to impart a force to move the regulating portion 20 in at least one direction. Also, it is contemplated that a biasing means can be incorporated to urge the regulating portion 20 to either its extended or retracted position (extended or collapsed bellows 80, for example), so that the actuator may only be needed to displace the regulatory portion 20 in one direction against the bias. Thus, an operative connection may merely require an abutment of an actuator element 100 with a valve portion without actual connection.

Figure 6:
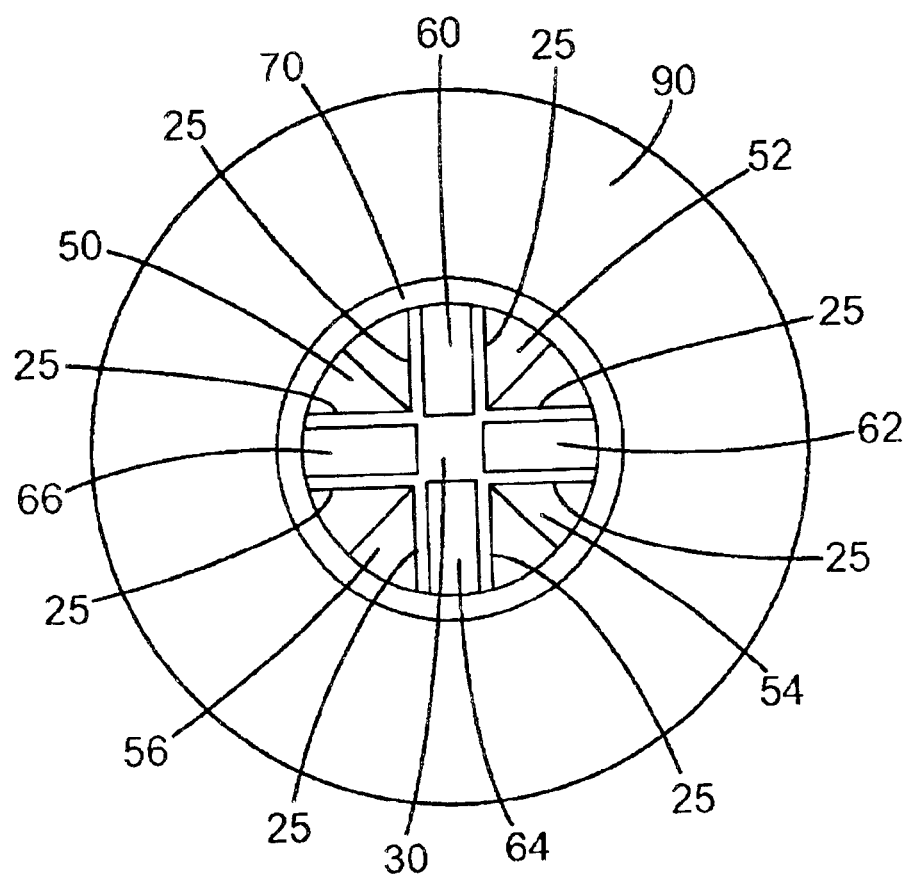
FIG. 6 is a top view of the embodiment of the valve shown in FIG. 4 of the present invention.

FIG. 6 is a top view of the embodiment of valve 10 shown in FIG. 4 of the present invention. The unique visual pattern formed by the preferred array of rectangular cross-section channels 60, 62, 64 and 66, together with triangular cross-section channels 50, 52, 54 and 56 is apparent from this view. As above, fluid flow is substantially maximized at the tip 30 while structural components or ribs 25 extend for fluid guidance substantially entirely to the tip 30.

Figure 7:
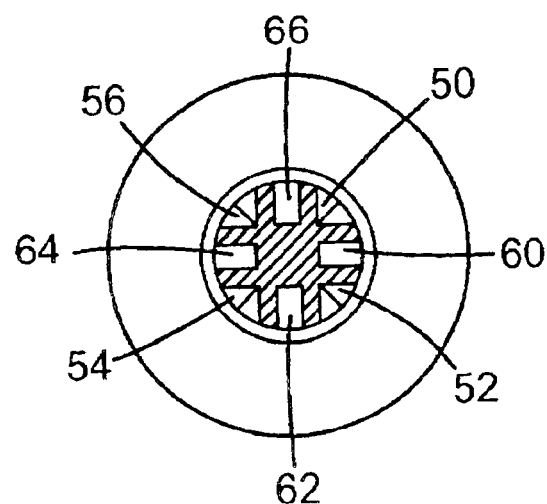
FIG. 7 is a cross-section of the valve shown in FIG. 5, taken along the line 7—7.

FIG. 7 is a cross-section of the regulating portion 20 of valve 10 shown in FIG. 5, taken along the line 7—7. From this view, one can see the somewhat smaller open areas that correspond to rectangular cross-section channels 60, 62, 64 and 66 and triangular cross-section channels 50, 52, 54 and 56 as compared to the open areas that would be available for fluid flow through channels at the fully open position of the stroke.

Figure 8:
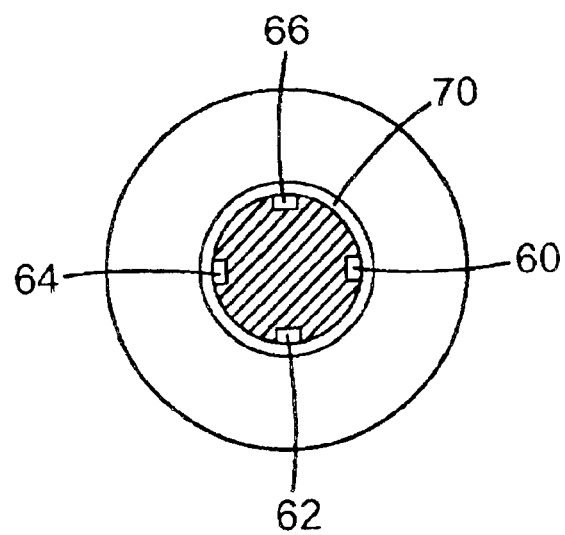
FIG. 8 is a cross-section of the valve shown in FIG. 5, taken along the line 8—8.

FIG. 8 is a cross-section of the regulating portion 20 of valve 10 shown in FIG. 5, taken along the line. From this view, one can see the very small opening areas that correspond to rectangular cross-section channels 60, 62, 64 and 66. At this position in the stroke of the valve, only very small open areas are provided for fluid flow through the channels.

A particularly preferred configuration of the valve having four rectangular channels and four triangular channels as described herein is particularly effective for fluid delivery applications wherein the fluid pressure is up to about 90 psi. Particularly preferred embodiments of the present invention have a regulating portion with a length of from the tip 30 to the point 40 near valve seat 70 of less than about 12 mm, and a diameter of the regulating portion of less than about 20 mm.

Preferably, all surfaces that come in contact with the fluid that flows through the valve assembly are made from materials that are compatible with respect to the particular fluid under conditions of temperature, pressure, chemical aggressiveness (such as acidity, basicity, and the like) and so forth in which the fluid transfer is carried out. In the semiconductor industry in particular, a wide variety of chemicals may be used, including highly corrosive process chemicals. All surfaces of the valve assembly that come in contact with such fluids should be resistant to these corrosive chemicals. Examples of such corrosive chemicals include strong inorganic acids, strong solvents, strong inorganic bases and peroxides. Failure of materials of the valve to resist the chemical nature of the fluid to be processed through the valve assembly may result in failure of the valve by leakage, or contamination of the fluid with materials from the valve.

Preferably, the surface contact materials are constructed from a fluoropolymer compound selected from the group of fluoropolymers including polytetrafluoroethylene (PTFE), fluorinated ethylene-propylene (FEP), perfluoroalkoxy fluorocarbon resin (PFA), ethylene-chloro trichloroethylene copolymer (ECTFE), ethylene-tetrafluoroethylene copolymer (ETFE), polyvinylidene fluoride (PVDF), and the like. A particularly preferred material is Teflon® PTFE, DuPont Co. of Wilmington, Del. It has surprisingly been found that Teflon® PTFE exhibits excellent longevity properties in the valve assembly of the present invention.

Components that do not contact the fluid that is transferred through the valve assembly of the present invention may be made from any material capable of providing suitable structural integrity and properties for their function. For example, the valve actuator mechanism may be made from any suitable plastic such as polypropylene, from metals such as stainless steel, and the like.

Components of the valve assembly of the present invention may be made by mold or machine processing, depending on the type of material used for the particular component.

The valve actuator to be used with valve assemblies of the present invention may be any appropriate system for controlling and moving valves. For example, the valve actuator may be spring biased to a closed position normally, and having an actuator that moves against the bias, the actuator being operated by pneumatic or hydraulic pressure. Typically the spring in spring biased actuators is made from metallic material and is configured to afford a resilient action.

The valve actuator connection may be any appropriate construction to attach the valve actuator to the valve and maybe controlled in any manner including automation or manual systems. For example, the valve may be threaded to provide a threaded attachment with complementary threads in the valve actuator. Alternatively the valve may be configured to provide an interference snap fit or the like with complementary attachment configuration located on the actuator.

The valves and valve assemblies of the present invention are useful for any fluid transfer wherein a combination of a highly metered delivery of fluid is required together with high flow capabilities from the same fluid source. Such uses include precision control of single fluid flow systems, precision control of mixtures of fluids, such as mixtures of fluids having different compositions and mixtures of fluids having different temperatures to achieve a desired final temperature. Most preferably, valves and valve assemblies of the present invention may be used for transporting chemically aggressive and chemically pure liquids without degrading and deleteriously affecting the liquids. In particular, the valves and valve assemblies of the present invention find preferred use in the semiconductor manufacturing industry. Process chemicals used in this industry must be either highly pure, or corrosively acidic or caustic to be effective for cleaning and treating semiconductor surfaces. The fluids used these processes must have a high degree of chemical purity to avoid contamination on a microscopic level.

Valves of the present invention find particular application in metering fluids from one location to another in a precise manner, wherein at some point in the fluid delivery operation a large amount of fluid flow is required. For example, a small amount of a certain liquid may be desired for addition to a reaction vessel for a reaction, followed by a large amount of the same or another liquid to flush or clean the reaction vessel. Alternatively, a number of valves of the present invention may be mounted in a manifold to provide continuous mixing or addition of a number of fluids in a continuous flow reaction or to conveniently prepare batch solutions for cleaning, chemical reaction, or the like. This construction provides convenience to the user by allowing any port in a manifold to be used for any selected fluid for incorporation in a solution without regard to the specific addition rate requirements of that fluid. Thus, the various parts of a manifold may be plumbed to provide a mixture of liquids to a vessel. The amounts of liquid added to the vessel may be greatly varied, depending on the particular process to be carried out. For example, a first process to be carried out may require addition of a large amount of water, while a second process may require only a small amount of water. The same manifold may be used to provide these different quantities of water without changing the plumbing or the valves. Alternatively the valves of the present invention find particular advantage as a universal mixing device where any liquid source may be attached through any valve in the manifold, because all valves can satisfy whatever flow requirements are established for any of the liquids to be used.

It is understood that valve assemblies and valves may be constructed in accordance with the principles of this invention as embodiments different from the embodiments specifically described herein. Such alternative embodiments are within the scope of the appended claims.

What is claimed is:

1. A valve for controlling fluid flowing through a valve body during successive strokes of the valve by controlled movement relative to a passage in the valve body, the valve comprising:

a regulating portion having a tip connected with a valve seat for engaging with a valve body seat to define a closed position of the valve body passage, the valve seat non-separably connected with the regulating portion, said regulating portion having a plurality of channels formed in an outer circumferential surface thereof, each of said channels defining a greater open area cross-section at a point nearer a tip of the regulating portion than a point nearer the valve seat so that fluid flowing through a valve body containing the valve can flow in a staged increase in flow as the valve regulating portion is controllably moved relative to the valve body passage, wherein at least one channel extends further toward the seat of the regulating portion than at least one other channel, said outer circumferential surface being parallel to the direction of stroke of the valve, wherein, at each cross section location of the stroke of the regulating portion, the open area cross-sections of said channels are symmetrically arranged to provide balanced fluid flow through the valve body wherein at least one of said channels has an oven area shave at a cross-section location of the regulating portion that is substantially rectangular, and wherein said valve further comprises a fluid boundary element movably operably connected to the valve for mounting the valve to the valve body.

2. A valve assembly for controlling fluid flowing through a valve body during successive strokes of a valve by controlled movement relative to a passage in the valve body, comprising:

a valve body having a fluid transfer housing having a valve body passage disposed therein, a fluid inlet and outlet in conmumication with the valve body passage, and a valve body seat positioned within the valve body passage between the fluid inlet and outlet;

a valve actuator housing connected with the fluid transfer housing and having a valve actuator disposed therein;

a valve attached to the end of the valve actuator and having a regulating portion disposed at least partially within the valve body passage, wherein the valve comprises:

a regulating portion having a lip connected with a valve seat for engaging with a valve body seat to define a closed position of the valve body passage, the valve seat non-separably connected with the regulating portion, said regulating portion having a plurality of channels formed in an outer circumferential surface thereof; each of said channels defining a greater open area cross-section at a point nearer a tip of the regulating portion than a point nearer the valve seat so that greater flow can be obtained as the regulating portion is controllably moved relative to the valve body passage, at least one of said channels having an open area shape different from the open area shape of at least one other channel at the same cross-section location of the regulating portion at least one of said channels has an open area shave at a cross-section location of the regulating portion that is substantially rectangular, said outer circumferential surface being parallel to the direction of stroke of the valve, wherein, at each cross section location of the stroke of the regulating portion, the open area cross-sections of said channels are symmetrically arranged to provide balanced fluid flow through the valve body, and wherein said valve further comprises a fluid boundary element movably operably connected to the valve and to the valve body to segregate fluid from the valve actuator;

said regulating portion being sized to form a non-interference fit within the valve passage so that a leak-light fitting is formed only when the valve seat is in contact with the valve body seat.

3. A valve for controlling fluid flowing through a valve body during successive strokes of the valve by controlled movement relative to a passage in the valve body, the valve comprising:

a regulating portion having a tip connected with a valve seat for engaging with a valve body seat to define a closed position of the valve body passage, said regulating portion having a plurality of channels formed in an outer circumferential surface thereof, each of said channels defining a greater open area cross-section at a point nearer a tip of the regulating portion than a point nearer the valve seat so that greater flow can be obtained as the regulating portion is controllably moved relative to the valve body passage, at least one of said channels having an open area shape different from the open area shape of at least one other channel at the same cross-section location of the regulating portion wherein at least one of said channels has an open area shape at a cross-section location of the regulating portion that is substantially rectangular, wherein, at each cross section location of the stroke of the regulating portion, the open area cross-sections of said channels are symmetrically arranged to provide balanced fluid flow through the valve body, said outer circumferential surface being parallel to the direction of stroke of the valve, and wherein said valve further comprises a fluid boundary element movably operably connected to the valve for mounting the valve to the valve body.

4. The valve of claim 3, wherein said channels are formed in the regulating portion of the valve wherein at least one channel extends further toward the seat of the regulating portion than at least one other channel, so that fluid flowing through a valve body containing the valve can flow in a staged increase in flow as the valve regulating portion is controllably moved relative to the valve body passage.

5. The valve of claim 3, wherein at least one of said channels has an open area shape at a cross-section location of the regulating portion that is substantially triangular.

6. The valve of claim 3, wherein at least two of said channels have art open area shape at a cross-section location of the regulating portion that is substantially triangular.

7. The valve of claim 3, wherein at least two of said channels have an open area shape at a cross-section location of the regulating portion that is substantially rectangular.

8. The valve of claim 3, wherein said channels comprise four channels having an open area shape at a cross-section location of the regulating portion that is substantially rectangular and four channels having an open area shape at a cross-section location of the regulating portion that is substantially triangular, said rectangular channels alternating with said triangular channels in symmetrical placement on said regulating portion.

9. The valve of claim 8, wherein said channels are formed in the regulating portion of the valve wherein the rectangular channels extend further toward the seat of the regulating portion than the triangular channels, so that fluid flowing through a valve body containing the valve can flow in a staged increase in flow as the valve regulating portion is controllably moved relative to the valve body passage.

10. The valve of claim 3, wherein the fluid boundary element comprises a bellows.

11. The valve of claim 3, wherein the fluid boundary element comprises a diaphragm.

12. The valve of claim 3, wherein the fluid boundary element comprises a flexible sleeve.

13. The valve of claim 3, wherein the valve is made from a fluoropolymer.

* * * * *

UNITED STATES PATENT AND TRADEMARK OFFICE
CERTIFICATE OF CORRECTION

PATENT NO.    : 6,807,984 B2
DATED         : October 26, 2004
INVENTOR(S)   : Volovets et al.

It is certified that error appears in the above-identified patent and that said Letters Patent is hereby corrected as shown below:

Column 10,
Lines 59 and 60, "…has an oven area shave at a…" should be -- …has an open area shape at a… --

Column 11,
Line 12, "…having a lip connected…" should be -- having a tip connected… --
Lien 18, "…thereof; each of said…" should be -- …thereof, each of said… --
Lines 25 and 26, "…regulating portion at least…" should be -- …regulating portion wherein at least… --
Line 27, "…area shave at a…" should be -- area shape at a… --
Line 40, "…leak-light fitting is…" should be -- …leak-tight fitting is… --

Column 12,
Line 27, "…channels having art open area…" should be -- …channels having an open area… --

Signed and Sealed this

Nineteenth Day of April, 2005

JON W. DUDAS
*Director of the United States Patent and Trademark Office*